United States Patent
Kim

(10) Patent No.: US 11,370,720 B2
(45) Date of Patent: Jun. 28, 2022

(54) METHOD OF PREPARING WOOD CHIP-TYPE MIXED ORGANIC COMPOSITE FERTILIZER

(71) Applicant: DONGSUH CO., LTD., Jeollanam-do (KR)

(72) Inventor: Chui Joo Kim, Jeollanam-do (KR)

(73) Assignee: DONGSUH CO., LTD., Jeollanam-do (KR)

(*) Notice: Subject to any disclaimer, the term of this patent is extended or adjusted under 35 U.S.C. 154(b) by 0 days.

(21) Appl. No.: 16/476,054

(22) PCT Filed: Dec. 29, 2017

(86) PCT No.: PCT/KR2017/015767
§ 371 (c)(1),
(2) Date: Jul. 3, 2019

(87) PCT Pub. No.: WO2018/128335
PCT Pub. Date: Jul. 12, 2018

(65) Prior Publication Data
US 2019/0330123 A1 Oct. 31, 2019

(30) Foreign Application Priority Data
Jan. 4, 2017 (KR) .................. 10-2017-0001533

(51) Int. Cl.
C05G 5/30 (2020.01)
C05F 1/00 (2006.01)
C05F 3/02 (2006.01)
C05F 5/00 (2006.01)
C05F 17/40 (2020.01)
C05F 17/50 (2020.01)

(52) U.S. Cl.
CPC .............. *C05G 5/30* (2020.02); *C05F 1/002* (2013.01); *C05F 1/007* (2013.01); *C05F 3/02* (2013.01);
(Continued)

(58) Field of Classification Search
CPC .......... C05F 1/007; C05F 17/40; C05F 17/50; C05F 1/002; C05F 3/02; C05F 5/002;
(Continued)

(56) References Cited

U.S. PATENT DOCUMENTS

2006/0135365 A1 6/2006 Chun
2010/0015689 A1 1/2010 Park et al.

FOREIGN PATENT DOCUMENTS

CN 1684928 A 10/2005
CN 102531775 A 7/2012
(Continued)

OTHER PUBLICATIONS

European Patent Office, European Search Report of corresponding EP Patent Application No. 17890736.6, dated Sep. 18, 2020.
(Continued)

*Primary Examiner* — Jennifer A Smith
(74) *Attorney, Agent, or Firm* — IP Legal Services, LLC

(57) ABSTRACT

The present invention relates to a method of preparing a wood chip-type organic composite fertilizer wherein the method comprises the steps of: (a) preparing wood chips by chipping; (b) preparing a liquid organic fertilizer; (c) forming an organic mixed solution; (d) obtaining colored wood chips by simultaneously immersing the wood chips of the step (a) in the organic mixed solution of the step (c) and applying hot air to the organic mixed solution to coat the woods chips with colors; (e) drying the wood chips to a high temperature to remove moisture formed on an outer surface of the wood chips of the step (d) and to make the organic mixed solution penetrate evenly into the wood chips at the same time; and (f) packing the dried wood chips of the step (e) by weight unit with the measurement thereof on a scale.

4 Claims, 1 Drawing Sheet

(52) U.S. Cl.
    CPC .............. *C05F 5/002* (2013.01); *C05F 17/40* (2020.01); *C05F 17/50* (2020.01)

(58) Field of Classification Search
    CPC ... C05F 5/00; C05F 1/00; C05B 17/00; C05G 3/00; C05G 5/30; C05D 9/00; C05D 1/00; C05C 11/00; Y02A 40/20; Y02W 30/40
    See application file for complete search history.

(56) References Cited

FOREIGN PATENT DOCUMENTS

| | | |
|---|---|---|
| FR | 2769855 A1 | 4/1999 |
| GN | 104496597 A | 4/2015 |
| JP | 03-193406 A | 8/1991 |
| KR | 10-1996-0008081 B1 | 6/1996 |
| KR | 10-2002-0029363 A | 4/2002 |
| KR | 10-2003-0093085 A | 12/2003 |
| KR | 10-0878566 B1 | 1/2009 |
| KR | 10-2009-0053566 A | 5/2009 |
| KR | 10-2009-0118529 A | 11/2009 |
| KR | 10-2010-0021103 A | 2/2010 |
| KR | 10-1000300 B1 | 12/2010 |
| KR | 10-1766452 B1 | 8/2017 |

OTHER PUBLICATIONS

The State Intellectual Property Office of People's Republic of China, Office Action of corresponding CN Patent Application No. 201780079802.8, dated ul. 20, 2021.

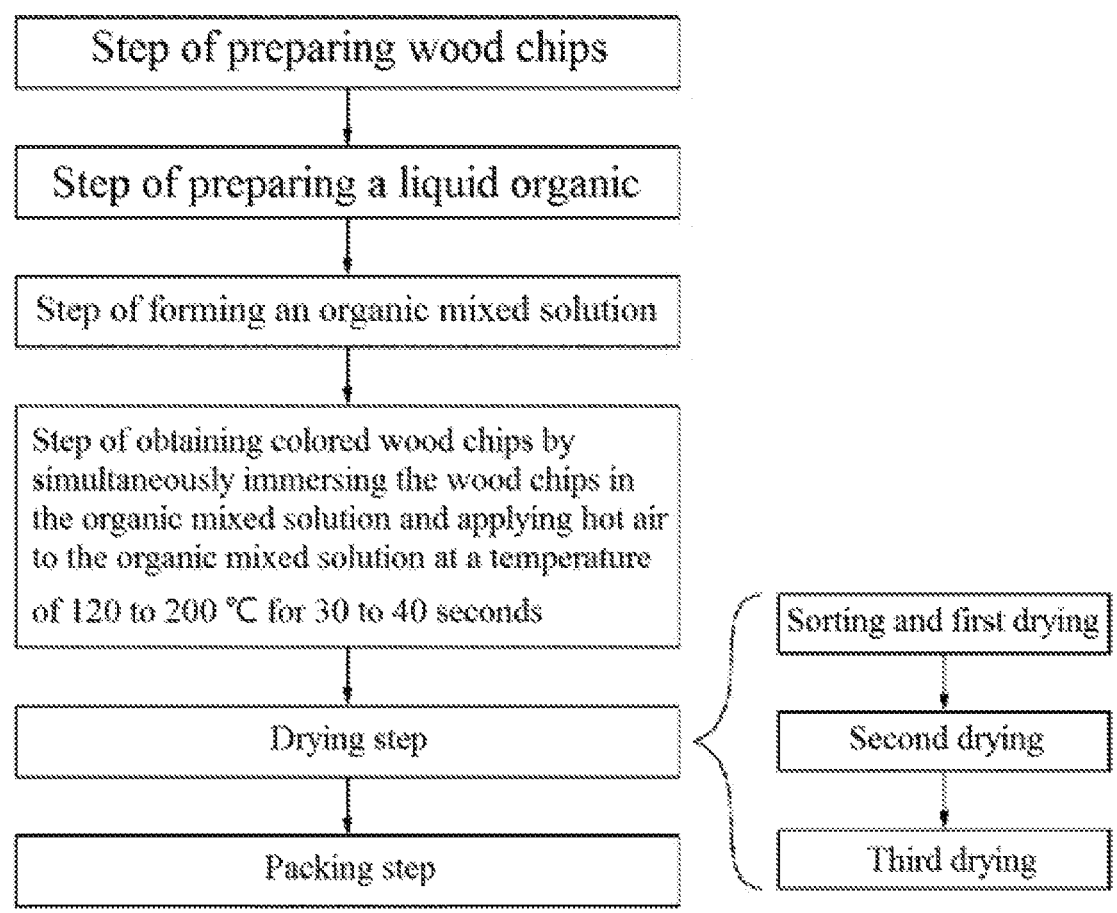

METHOD OF PREPARING WOOD CHIP-TYPE MIXED ORGANIC COMPOSITE FERTILIZER

CROSS REFERENCE TO RELATED APPLICATIONS

This application is a National Stage Patent Application of PCT International Patent Application No. PCT/KR2017/015767 (filed on Dec. 29, 2017) under 35 U.S.C. § 371, which claims priority to Korean Patent Application No. 10-2017-0001533 (filed on Jan. 4, 2017), the teachings of which are incorporated herein in their entireties by reference.

TECHNICAL FIELD

The present invention relates to a method of preparing a wood chip-type organic composite fertilizer and, more specifically, to a method of preparing a wood chip-type organic composite fertilizer which not only abundantly supplies nutrients to soil and crops, but also can express beauty of landscaping appearance by applying wood chips containing a large amount of composite organic matter (animal and vegetable materials) and having various colors to horticulture, landscaping or the like.

BACKGROUND ART

Countries having lumber resources have recently been strengthening forest industry protection according to resource nationalism, and calls for limiting commercial lumbering due to a global warming problem that is an international cooperation issue have been growing louder. Therefore, the countries having the low degrees of lumber self-sufficiency should diversely find means for increasing degrees of domestic lumber self-sufficiency since countries having low degrees of lumber self-sufficiency may have much difficulties in lumber import in the future.

In order to increase productivity of forest trees and shorten final ages of the forest trees, maintenance of a balanced circulation system of appropriate fertilizer application and stand is essential, and even advanced forestry countries that are timber exporting countries have been performing reasonable fertilizer applications suitable for those countries according to various research results.

A fertilizer which has currently been used for forest employment in Korea includes only one type of a solid composite fertilizer for forest that had been developed in 1977, wherein the solid composite fertilizer for forest comprises nitrogen (N), phosphorous (P) and potassium (K) at a component ratio of 12:16:4, and about 15% of zeolite, limestone and the like is additionally mixed therewith.

The solid composite fertilizer for forest has greatly contributed to restoration of Korean forest that had been devastated by Japanese occupation and the Korean War. However, 30 years later since the solid composite fertilizer for forest was produced, there have been many changes in forest soil environment conditions of Korea compared to those days when the solid composite fertilizer for forest was initially used, and a single component ratio has been uniformly used without considering various forest land conditions and various target species. Therefore, a new fertilizer form suitable for current circumstances and a new fertilizer application standard according to the fertilizer are needed.

Korean forest soils have large differences in physico-chemical properties of soils by regional groups, parent rocks, and soil conditions. Accordingly, Korean forest soils not only have differences in growth amounts of forest trees, but also are soils having shallow soil depths and very low organic contents. Therefore, consistent fertilizer application management is required.

On the other hand, fertilizers are used for the purposes of growth promotion, fructification enhancement, and protection for damages by blight and harmful insects with respect to plant resources such as agricultural produces, crops, and trees. Such fertilizers include the nutritive components to replenish the deficient amounts of the nutritive components since the plant resources absorb deficient amounts of nutritive components from the soil. Various nutritive components such as nitrogen, phosphorous, potassium, organic matter, moisture, and the like are contained in the fertilizers. Particularly, there are many fertilizers strengthening components such as nitrogen, phosphorous, potassium, and the like.

There is a high tendency that the fertilizers excessively flow out since most of chemical fertilizers that have currently been used, as straight fertilizers, are dissolved in water and absorbed into plants, and the fertilizers are applied in an excessive amount compared to a fertilizer absorption amount.

Further, since the fertilizers cannot be used such that the plants absorb fertilizer components all at once right after applying the fertilizers, applied fertilizers may have high loss amounts caused by various natural phenomena such as landslide, flood, forest fire and the like, and lost fertilizers may be adsorbed onto the soil or permeated into underground water within the soil to cause soil pollution and groundwater contamination.

Therefore, as a technology for solving the above-mentioned problems, 'By-product fertilizer (compost) using wood chip fermentation process and microorganisms, and preparation method thereof are disclosed in Korean Patent Application Publication No. 10-2002-0029363.

The above technology is comprised of a mixing process of mixing 65 to 75 parts by weight of sawdust with 25 to 35 parts by weight of wood chips based on 100 parts by weight of fowl droppings; a first fermentation process of stacking mixed fowl droppings obtained by the mixing process in the open air to decompose protein, amino acid, glucide, starch and the like that are easily decomposed; a second fermentation process of fermenting the mixed fowl droppings passing through the first fermentation process in a baroque process fermentation room at a temperature of 70 to 75° C. for 15 days; a watering process of performing a watering operation at three day intervals during the second fermentation process to solve water shortage caused by vapor evaporated during fermentation; a third fermentation process of fermenting a mixture of fowl droppings, sawdust and wood chips passing through the second fermentation process in a after-ripening room for 6 months or more; a sorting process of sorting the wood chips from a mixture passing through the third fermentation process; and a microorganism adding and standardizing process of culturing large amounts of *phytophthora* blight and anthrax bacterium-resistant strains and adding the cultured large amounts of the *phytophthora* blight and anthrax bacterium-resistant strains to a compost passing through the sorting process to standardize a resulting material using zeolite or the like.

However, although the above-mentioned technology enables the by-product fertilizer to perform the function as a fertilizer (or compost), the preparation process is very complicated and comprises the fermentation process such that it takes a long period of time to perform the preparation process. Therefore, the technology is not suitable for mass production. Particularly, the technology has been had a problem of cost increase or the like in the maintenance aspect since the microorganisms should be periodically managed along with a problem that it takes a considerably short period of time for the microorganism to perform the function as the fertilizer since microorganisms are cultured and added such that the microorganisms perform fast-acting decomposition activities.

PRIOR ART DOCUMENTS

Patent Documents (Patent document 1) Korean Patent Application Publication No. 10-2002-0029363 (Apr. 18, 2002)
(Patent document 2) Korean Patent Application Publication No. 10-2010-0021103 (Feb. 24, 2010)
(Patent document 3) Korean Patent Registration No. 10-1000300 (Dec. 6, 2010)

DISCLOSURE

Technical Problem

In order to solve the foregoing problems, the purpose of the present invention is to provide a method of preparing a wood chip-type organic composite fertilizer which not only properly adjusts temperature and moisture required for growth of crops by applying a fertilizer formed in the form of wood chips to horticulture, landscaping or the like, but also helps in the growth of the crops by abundantly supplying nutrients to soil and crops, and particularly enables the wood chip-type organic composite fertilizer to perform the function as the fertilizer for a long period of time by forming the wood chip-type organic composite fertilizer in the form of the wood chips, thereby enabling a biological slow-release fertilizer effect to be exhibited through a gradual decomposition of the wood chips.

Technical Solution

In order to achieve the purpose, the present invention provides a method of preparing a wood chip-type organic composite fertilizer, the method comprising the steps of: ⓐ preparing wood chips by chipping at least one region of an outer bark-stripped unsawn timber, a bough, and a root into chips having a diameter of 1 to 4 cm; ⓑ preparing a liquid organic fertilizer by blending 73.0 to 80.0 wt % of an organic by-product, 6.1 to 9.0 wt % of a nutrient in which nitrogen (N), phosphorous (P) and potassium (K) are mixed at a weight ratio of 1:0.1 to 0.4:1.0 to 5.0, and 13.9 to 18.0 wt % of water ($H_2O$); ⓒ forming an organic mixed solution by mixing 75.0 to 85.6 wt % of the organic fertilizer of the step ⓑ with 0.10 to 5.0 wt % of a water-dispersible binder and 14.3 to 20.0 wt % of a colorant; ⓓ obtaining colored wood chips by simultaneously immersing the wood chips of the step ⓐ in the organic mixed solution of the step ⓒ and applying hot air to the organic mixed solution at a temperature of 120 to 200° C. for 30 to 40 seconds to coat the woods chips with colors; ⓔ drying the wood chips to a high temperature to remove moisture formed on an outer surface of the wood chips of the step ⓓ and to make the organic mixed solution penetrate evenly into the wood chips at the same time; and ⓕ packing the dried wood chips of the step ⓔ by weight unit with the measurement thereof on a scale.

In addition, drying of the wood chips in the step ⓔ comprises the steps of: sorting a good product and a defective product from the wood chips while transferring the wood chips through a conveyor, and primarily drying the wood chips by applying hot air toward a conveyor belt from an air blower or a heater at the same time; secondly drying the wood chips by transferring the primarily dried wood chips to a rotary dryer through the conveyor, and applying hot air to the wood chips within the rotary dryer; and transferring the secondly dried wood chips to a discharger through the conveyor to discharge the wood chips from the discharger, and applying hot air to the wood chips from the air blower or the heater to thirdly dry the wood chips at the same time.

Meanwhile, the organic by-product of the step ⓑ is one or a mixture of two or more of vegetable organic matters selected from soybean meal, castor meal, rapeseed meal, Neem meal, rice bran oil cake, saccharide, peat, *Calamagrostis neglecta* (Ehrh.) Gaertn., Mey. et Scherb. var. *aculeolata* (Hackel) *Miyabe* et Kudo, sawdust, molasses, rice hulls, and animal organic matters selected from bone dust, guano, pressed fish cake, fish meal, chitosan, amino acid and steamed leather meal.

Further, the water-dispersible binder of the step ⓒ is one or a mixture of two or more of polyurethane, alkyd resin, polyacryl, polyurea, polyamide, polyolefin, polyvinyl acetate, polyether, a urethane based-acrylate based copolymer, a vinyl based-urethane based copolymer, an ethylene-vinyl alcohol based copolymer, a polyester copolymer, a silicone-acryl-urethane copolymer, and an ethylene/vinyl acetate copolymer.

And, the colorant of the step ⓒ is one selected from an inorganic pigment and an organic dye.

Advantageous Effects

A wood chip-type organic composite fertilizer prepared by the foregoing method has effects that, firstly, it not only can exhibit a function of helping in the growth of the crops for a long period of time, but also can properly adjust temperature and moisture required for the growth of the crops by gradually decomposing the wood chips to obtain a biological slow-release fertilizer effect, thereby sufficiently supplying nutrients to soil and crops, secondly, it can perform a heat insulating material function of reducing width of a temperature change in the soil by reducing transfer of solar heat to the inside of the soil, and thirdly, it can increase landscape properties of planted trees by adding various colors to the wood chips.

DESCRIPTION OF DRAWINGS

FIG. 1 is a process chart showing a method of preparing a wood chip-type organic composite fertilizer according to a preferred embodiment of the present invention.

DETAILED DESCRIPTION OF THE INVENTION

A method of preparing a wood chip-type organic composite fertilizer of the present invention comprises the steps of:

ⓐ preparing wood chips by chipping at least one region of an outer bark-stripped unsawn timber, a bough, and a root into chips having a diameter of 1 to 4 cm;

ⓑ preparing a liquid organic fertilizer by blending 73.0 to 80.0 wt % of an organic by-product, 6.1 to 9.0 wt % of a nutrient in which nitrogen (N), phosphorous (P) and potassium (K) are mixed at a weight ratio of 1:0.1 to 0.4:1.0 to 5.0, and 13.9 to 18.0 wt % of water (H₂O);

(c) forming an organic mixed solution by mixing 75.0 to 85.6 wt % of the organic fertilizer of the step (b) with 0.10 to 5.0 wt % of a water-dispersible binder and 14.3 to 20.0 wt % of a colorant;

(d) obtaining colored wood chips by simultaneously immersing the wood chips of the step (a) in the organic mixed solution of the step (c) and applying hot air to the organic mixed solution at a temperature of 120 to 200° C. for 30 to 40 seconds to coat the woods chips with colors;

(e) drying the wood chips to a high temperature to remove moisture formed on an outer surface of the wood chips of the step (d) and to make the organic mixed solution penetrate evenly into the wood chips at the same time; and (f) packing the dried wood chips of the step (e) by weight unit with the measurement thereof on a scale.

Hereinafter, as described above, a method of preparing a wood chip-type organic composite fertilizer is divided into each of the steps, and described in detail as follows.

—Follows—

Step (a)

The step (a) is a step of preparing wood chips by chipping at least one region of an outer bark-stripped unsawn timber, a bough, and a root into chips having a diameter of 1 to 4 cm, wherein the wood chips refer to wood pieces or splinters showing a shape as if wood is chopped by an ax by treating the at least one region of the outer bark-stripped unsawn timber, the bough, and the root using a grinder or a crusher, and the wood chips according to the present invention can perform various functions such as maintenance of soil moisture, control of ground temperature, prevention of soil erosion, weed suppression, prevention of soil borne pathogen, prevention of soil contamination, and the like. Further, the wood chips can create a beautiful life environment by adding various colors to the wood chips while preserving an intrinsic fertilizer function.

In addition, the wood chips not only enables oxygen to be smoothly supplied by forming pores in the mixture, but also can smoothly supply moisture required for the action of the microorganisms since the wood chips enable moisture to be gradually discharged after absorbing moisture during watering. Further, composting may be properly made by creating an environment favorable to the action of the microorganisms although a separate microbial preparation is not used since the microorganisms are attached to the wood chips themselves.

On the other hand, wood suitable for the wood chips preferably includes coniferous trees which make it difficult to be decomposed by the microorganisms and, more preferably, pine tree, Hinoki cypress, *Cryptomeria japonica*, wollemi pine, red pine, and others among the coniferous trees. Particularly, wood that is the most useful as the wood chips is pine tree in which wood fiber is well developed, and of which an inexpensive bark portion can be mainly used.

The foregoing step comprises chipping at least one selected region of the unsawn timber, bough and root, wherein the chipping process means cutting the at least one selected region of the selected unsawn timber, bough and root into wood chips with a predetermined size. At this time, it is preferable to strip an outer layer of the selected region such that the chipping process can be easily performed.

Here, it is preferable that the chipping process-performed wood chips each have a diameter of 1 to 4 cm since colorization of the water-dispersible binder or the colorant over the entire surface of the wood chips may not be uniformly made in a subsequent process, i.e., the step of forming the organic mixed solution when the chipping process-performed wood chips have a diameter of more than 4 cm, and rapid action of the wood chips may be progressed when the chipping process-performed wood chips have a diameter of less than 1 cm. Therefore, it is preferable that the chipping process-performed wood chips have the diameter of 1 to 4 cm.

As an additional example, the foregoing step may comprise crushing waste wood as a raw material for the wood chips into a predetermined size to use the waste wood crushed into a predetermined size. The wood chips, as wood fragments obtained by crushing arbitrary wood, can be preferably obtained by crushing a forest tree waste obtained by thinning forestland or waste building lumber into a predetermined size. Further, since the wood chips are porous due to characteristics of a material, various nutrients required for growth of planted plants and the like may be retained within the wood chips.

Step (b)

The step (b) is a step of preparing a liquid organic fertilizer by blending 73.0 to 80.0 wt % of an organic by-product, 6.1 to 9.0 wt % of a nutrient in which nitrogen (N), phosphorous (P) and potassium (K) are mixed at a weight ratio of 1:0.1 to 0.4:1.0 to 5.0, and 13.9 to 18.0 wt % of water (H₂O), wherein the foregoing step is a step of preparing an organic fertilizer by blending animal and vegetable organic materials, a nutrient and water in order to adsorb organic composite fertilizer components onto the wood chips.

Here, a composting process by the organic fertilizer is referred to as follows. The composting process is usually a process in which organic matter is decomposed and stabilized by the microorganisms, wherein a compost that is a final product of the composting process not only should be used in the soil without having a negative effect on the environment, but also should secure storage properties. Decomposition mechanisms of carbohydrate, protein and fat show aspects that are slightly different from one another in a composting reaction of the decomposition process, wherein the carbohydrate is changed into monosaccharides, and the monosaccharides are made to react with oxygen such that the monosaccharides are finally decomposed into carbon dioxide (CO₂) and water (H₂O). This, as the same phenomenon as combustion, enables the reaction to be performed at low temperatures by allowing oxygen possessed by an organism to act as a catalyst. A reaction formula of the reaction can be arranged as follows.

$$C_m(H_2O)_n + m(O_2) \rightarrow mCO_2 + nH_2O$$

Meanwhile, the organic by-product may include a mixture obtained by mixing the resulting materials after forming one or a mixture of two or more of vegetable organic matters selected from soybean meal, castor meal, rapeseed meal, Neem meal, rice bran oil cake, saccharide, peat, *Calamagrostis neglecta* (Ehrh.) Gaertn., Mey. et Scherb. var. *aculeolata* (Hackel) *Miyabe* et Kudo, sawdust, molasses, rice hulls, and animal organic matters selected from bone dust, guano, pressed fish cake, fish meal, chitosan, amino acid and steamed leather meal in the form of a powder or the like, thereby obtaining resulting materials. Further, the above-listed organic by-products may be obtained by crushing the foreign materials and lumped raw materials having large particle sizes using a conventional crusher when foreign materials and lumped raw materials are carefully selected.

The organic by-product is preferably contained in an amount of 73.0 to 80.0 wt % with respect to the total amount of a composition in the foregoing step. The wood chip-type organic composite fertilizer does not properly exhibit a function as the fertilizer since action mechanism of the fertilizer shows nonuniformity when the amount of the organic by-product is more than 80.0 wt %, while the wood chip-type organic composite fertilizer does not exhibit ability to perform decomposition action since organic materials are contained in an insignificant amount when the amount of the organic by-product is less than 73.0 wt %.

Further, a nutrient comprising nitrogen (N), phosphorous (P) and potassium (K) as components of an inorganic fertilizer may be formed. The nutrient comprising the nitrogen, phosphorous and potassium is preferably contained in an amount of 6.1 to 9.0 wt % with respect to the total amount of a composition. There is not a difference between the wood chip-type organic composite fertilizer and a general chemical fertilizer as the above-mentioned organic by-product cannot be sufficiently added when the nutrient is contained in an amount of more than 9.0 wt %, while efficacy of the contained in an amount of 6.1 to 9.0 wt % as the fertilizer may be lowered since the components of the inorganic fertilizer are contained in very small amounts when the nutrient is contained in an amount of less than 6.1 wt %.

In addition, although a ratio of ratio of nitrogen, phosphorous and potassium components in the nutrient of the composition according to a preferred embodiment of the present invention may be easily adjusted to a ratio desired by a person of an ordinary skill in the art by adjusting the amount of the organic by-product that is added, a preferable mixing ratio of the nitrogen, phosphorous and potassium is 1:0.1 to 0.4:1.0 to 5.0.

The water ($H_2O$), which is added to form the organic fertilizer in the foregoing step in a liquid phase, may be preferably contained in an amount of 13.9 to 18.0 wt % with respect to the total amount of the composition. Components performing functions of the fertilizer in the organic by-product and nutrient may be diluted by physical bonding of oxygen and hydrogen when the water is contained in an amount of more than 18.0 wt %, while mixing with other components in the following step may be difficult since the composition blended in the foregoing step may subject to semi-solidification when the water is contained in an amount of less than 13.9 wt %.

Step ⓒ

The step ⓒ is a step of forming an organic mixed solution by mixing 75.0 to 85.6 wt % of the organic fertilizer of the step ⓑ with 0.10 to 5.0 wt % of a water-dispersible binder and 14.3 to 20.0 wt % of a colorant, wherein the organic fertilizer in the foregoing step is preferably contained in an amount of 75.0 to 85.6 wt % with respect to the total amount of a composition. A specific organic carbon source or the like cannot be added sufficiently since the fertilizer is contained in a very high amount when the organic fertilizer is contained in an amount of more than 85.6 wt %, while it is difficult to prepare a preferable wood chip-type organic composite fertilizer in the present invention since an effect of the wood chip-type organic composite fertilizer as the fertilizer is decreased when the organic fertilizer is contained in an amount of less than 75.0 wt %.

Moreover, the water-dispersible binder in the foregoing step is preferably contained in an amount of 0.10 to 5.0 wt % with respect to the total amount of the composition. When the water-dispersible binder is contained in an amount of more than 5.0 wt %, the water-dispersible binder not only causes trouble at work by increasing adhesiveness due to an excessive amount of the binder, thereby allowing the wood chips to mutually adhere to each other, but also makes it difficult to use operation equipment since the binder may be hardened while the binder is being remained. When the water-dispersible binder is contained in an amount of less than 0.10 wt %, the colorant may not be evenly coated over the entire surface of the wood chips since the binder is contained in an extremely insignificant amount.

Here, examples of the water-dispersible binder may include one or a mixture of two or more selected from listed types of dispersible binders including polyurethane, alkyd resin, polyacryl, polyurea, polyamide, polyolefin, polyvinyl acetate, polyether, a urethane based-acrylate based copolymer, a vinyl based-urethane based copolymer, an ethylene-vinyl alcohol based copolymer, a polyester copolymer, a silicone-acryl-urethane copolymer, and an ethylene/vinyl acetate copolymer.

An additional example of the present invention, the water-dispersible binder has transparency and may include a urethane-based adhesive or a wood composite adhesive comprising natural tannin (vegetable tannin) extracted from wood.

The wood composite adhesive may be comprised of 40 to 60 wt % of a polyisocyanate-based compound, 15 to 40 parts by weight of ethylene glycol, and 5 to 8 parts by weight hexamine with respect to 100 parts by weight of an aqueous natural tannin solution extracted from wood.

The aqueous natural tannin solution is prepared by dissolving a powder obtained by drying the extract after extracting an extract from wood in water ($H_2O$), and 30 to 60 wt % of an aqueous tannin solution is used as the aqueous natural tannin solution. Since such a aqueous natural tannin solution is in the same homogeneous series as the wood chips of the present invention, the aqueous natural tannin solution has an advantage that it can further improve adhesiveness of the wood chips.

In addition, the hexamine performs a reaction catalytic function of a polyisocyanate-based compound and ethylene glycol and a crosslinking reaction accelerating function of the aqueous natural tannin solution and the polyisocyanate-based compound, and the polyisocyanate-based compound is hexamethylene isocyanate or phenylene diisocyanate.

On the other hand, the colorant may be formed of any one selected from an inorganic pigment or an organic dye, wherein the inorganic pigment, as a generic term expressing coloring matters of inorganic compounds in pigments, and titanium dioxide ($TiO_2$), zinc oxide (ZnO), lithopone or the like may be used as the inorganic pigment, and examples of the inorganic pigment may include a black pigment carbon black which is a black fine carbon powder corresponding to so-called soot, has a carbon particle size of 1 to 500 nm, and is similar to graphite, or the like, a grey pigment such as a slate powder or the like, a red pigment such as bangala or the like, a brown pigment such as ferrous oxide (FeO) or the like, and a yellow pigment such as zinc chromate or the like. Further, the examples of the inorganic pigment may include other pigments such as copper(II) oxide (CuO), chromium dioxide ($CrO_2$), $Cu(OH)_3$, calcium carbonate ($CaCO_3$), copper(II) sulfide (CuS), and the like.

Examples of the organic dye may include direct dyes, vat dye, naphthol dye, reactive dyestuff, acid dye, acid mordant dye, and the like. For the purpose of desirable coloration in the foregoing step, it is desirable to use the inorganic pigment along with a dispersant, and it may be preferable to use the organic dye along with a stabilizer such as a mordant.

Meanwhile, the colorant is preferably contained in an amount of 14.3 to 20.0 wt % with respect to the total amount of a composition. When the colorant is a mixture of the inorganic pigment and the organic dye, it goes without saying that an amount of the mixture should satisfy an amount range of the colorant, and it is preferable to mix the inorganic pigment with the organic dye at the mixing ratio of 1:0.8 to 1.2 although a mixing ratio thereof is not particularly limited.

It is difficult to obtain substantial changes in colors when the colorant is contained in an amount of more than 20.0 wt % with respect to the total amount of the composition, while it may be difficult to enable implementation of the colors in the wood chips when the colorant is contained in an amount of less than 14.3 wt % with respect to the total amount of the composition.

As an additional example of the present invention, the composition may further comprise an additive in addition to the organic fertilizer, the water-dispersible binder and the colorant.

Types of the additive may comprise a dispersant, a stabilizer, an antifoaming agent, a water repellent, a UV stabilizer, an antimicrobial agent, an insecticide, a penetration accelerator, a curing agent, etc., and may additionally comprise other additives for the purpose of improving physical properties.

Here, the dispersant includes an anionic dispersant, a nonionic dispersant and a polymeric dispersant, and the anionic dispersant may include a dispersant containing an anionic functional group such as carboxylate, sulfonate, phosphonate, phosphinate, or the like.

The nonionic dispersant includes a dispersant containing a nonionic functional group such as an ethylene oxide group, a propylene oxide group or the like. The polymeric dispersant preferably includes polycarboxylate, lignosulfonate, sulfonated styrene copolymer or the like and, more specifically, includes compounds having dispersion ability with respect to water such as hydrolyzed or partially hydrolyzed acrylamides/acrylates, hydroxypropyl acrylate, phosphinocarboxylates, a phosphonate functional group-containing polymer, polymaleates, sulfonated styrene/maleic anhydride copolymers, polycarboxylated phosphonates, acrylate/acrylamide copolymers, acrylate/maleic acid copolymers, N-methyl-2-pyrrolidone (NMP), inorganic phosphates, non-modified or modified lignin, tannins, CMS (carboxylmethyl cellulose), polyacrylamide, polyacrylate, polymethylacrylate, and the like.

Step ⓓ

The step ⓓ is a step of obtaining colored wood chips by simultaneously immersing the wood chips of the step ⓐ in the organic mixed solution of the step ⓒ and applying hot air to the organic mixed solution at a temperature of 120 to 200° C. for 30 to 40 seconds to coat the woods chips with colors, wherein the foregoing step is a step of obtaining an organic composite fertilizer and forming colors on wood chips having a substrate of the organic composite fertilizer at the same time by adsorbing the organic mixed solution prepared in the step ⓒ onto the wood chips prepared in the step ⓐ, thereby supplying oxygen to the organic mixed solution adsorbed onto the wood chips.

On the other hand, hot air or the like may be applied to the organic mixed solution at a temperature of 120 to 200° C. for 30 to 40 seconds to coat the wood chips with colors, wherein, when hot air or the like is applied such that time or temperature is deviated from the time range or temperature range, it may be difficult to form the colors on the wood chips, or there is a high possibility that discoloration of the colors may be generated within dozens of hours to several days although the colors are formed. Accordingly, it is preferable to apply hot air to the organic mixed solution at a temperature of 120 to 200° C. for 30 to 40 seconds to coat the wood chips with colors.

Step ⓔ

The step ⓔ is a step of drying the wood chips to a high temperature to remove moisture formed on an outer surface of the wood chips of the step ⓓ and to make the organic mixed solution penetrate evenly into the wood chips at the same time, wherein the wood chip drying process in the foregoing step may be performed by passing through the following steps specifically.

First, the wood chips are primarily dried by sorting a good product and a defective product to separately sort wood chips which have not been properly colored or have lost a product value while transferring the wood chips through a conveyor, and applying hot air toward a conveyor belt from an air blower or a heater at the same time, the wood chips are secondly dried by transferring the primarily dried wood chips to a rotary dryer through the conveyor and applying hot air to the wood chips within the rotary dryer, and the wood chips are thirdly dried to finally obtain a wood chip-type organic composite fertilizer by transferring the secondly dried wood chips to a discharger through the conveyor to discharge the wood chips from the discharger and applying hot air to the wood chips from the air blwer or the heater at the same time.

A reason that the drying process comprised of various steps is performed as described above is that colors of the wood chips can be maintained for a long time, and the wood chips can be protected from mold and the like by forming a coating film on the wood chips, thereby improving durability and weatherability of the wood chips. Further, the drying process can also be performed only by leaving alone the wood chips at room temperature in addition to the foregoing drying steps.

Step ⓕ

The step ⓕ is a step of packing the dried wood chips of the step ⓔ by weight unit with the measurement thereof on a scale, wherein the foregoing step may further comprise a step of performing a preservative treatment process as an additional example. A reason that the preservative treatment process is performed is to sterilize mold which may be adhered to the wood chips and bacteria or the like which may cause decomposition, and to maintain durability of packaging. It is preferable to use AQC (alkaline copper quarternary) preservative treatment agent comprised of copper-alkyl ammonium compounds. Details about chemical components and preparation method of ACQ will not be described since the chemical components and preparation method of ACQ are well known to those skilled in the art. Meanwhile, when performing a preservative treatment process on the wood chips, the drying process of the step ⓔ may be performed again.

On the other hand, the wood chips may be commercialized by weighing the wood chips on a scale and packing the wood chips by weight unit.

Hereinafter, the present invention will be described more specifically through Example and Experimental Example.

EXAMPLE

1. Preparation of Wood Chips

After cutting-down pine tree in a permitted area and stripping an outer bark of a bough of the cut-down pine tree, wood chips were prepared by crushing the outer bark-stripped bough into chips having a diameter of about 2 to 4 cm using a crusher.

2. Preparation of an Organic Mixed Solution

After preparing a liquid organic fertilizer by mixing an organic by-product obtained by mixing 3.5 kg of rapeseed meal, 2.1 kg of bone dust and 2 kg of fish meal, 800 g of a nutrient obtained by mixing 5.8% of nitrogen, 0.14% of phosphorous and 1.5% of potassium, and 1.2 L of water, an organic mixed solution was prepared by mixing 7.5 kg of the prepared organic fertilizer, 300 g of a water-dispersible binder formed of polyether, and 1.7 kg of a colorant.

3. Preparation of a Wood Chip-Type Organic Composite Fertilizer

After immersing about 500 g of the wood chips in 2 L of the prepared organic mixed solution for about 30 seconds and applying hot air of 150° C. to the wood chips immersed in the organic mixed solution, a wood chip-type organic composite fertilizer was finally prepared by taking-out the wood chips immersed in the organic mixed solution again from the organic mixed solution and performing a process of drying the wood chips taken-out from the organic mixed solution three times in an automated drying facility.

[Experimental Example] Measuring Changes in Soil Compositions

The wood chips prepared in Example were set as an experimental group, and wood chips that had not been treated with the organic mixed solution in Example were set as a control group. Further, after acquiring products of three companies (Company A, Company G, and Company B) that had been commercially available as the organic composite fertilizer on the general market, the acquired products were each set as a preparation of Company A, a preparation of Company G, and a preparation of Company B.

Further, a period from before experiment to after experiment was set as 30 days, and changes in the soil compositions were measured based on total 7 items including variations in acidity, organic matter, available phosphate, potassium, calcium, magnesium, and electric conductivity. The measurement results are shown in the following Table 1.

TABLE 1

| Classification | | | Soil compositions | | | | | | |
|---|---|---|---|---|---|---|---|---|---|
| Test group | Time of examination | Acidity (1:5) | Organic matter (g/kg) | Available phosphate (mg/kg) | Potassium | Calcium | Magnesium | Electric conductivity (dS/m) |
| Experimental group | Before experiment (A) | 7.3 | 40 | 1021 | 0.50 | 13.1 | 6.2 | 1.51 |
| | After experiment (B) | 7.1 | 32 | 813 | 0.23 | 11.5 | 6.9 | 0.96 |
| | Difference (A-B) | −0.2 | −8 | −208 | −0.27 | −1.6 | +0.7 | −0.55 |
| Preparation of Company A | Before experiment (A) | 7.2 | 37 | 955 | 0.36 | 12.1 | 5.6 | 1.30 |
| | After experiment (B) | 7.1 | 36 | 820 | 0.19 | 11.4 | 6.2 | 1.06 |
| | Difference (A-B) | −0.1 | −1 | −135 | −0.17 | −0.7 | +0.6 | −0.24 |
| Preparation of Company G | Before experiment (A) | 7.0 | 39 | 1094 | 0.39 | 11.0 | 6.0 | 1.83 |
| | After experiment (B) | 7.0 | 33 | 705 | 0.14 | 10.1 | 6.7 | 1.38 |
| | Difference (A-B) | 0 | −6 | −389 | −0.25 | −0.9 | +0.7 | −0.45 |
| Preparation of Company B | Before experiment (A) | 7.0 | 34 | 886 | 0.34 | 10.6 | 5.0 | 1.39 |
| | After experiment (B) | 7.0 | 32 | 822 | 0.16 | 9.6 | 6.8 | 1.06 |
| | Difference (A-B) | 0 | −2 | −64 | −0.18 | −1.0 | +1.8 | −0.33 |
| Control group | Before experiment (A) | 7.1 | 33 | 851 | 0.30 | 10.2 | 4.9 | 1.46 |
| | After experiment (B) | 6.9 | 32 | 820 | 0.19 | 10.1 | 6.8 | 1.03 |
| | Difference (A-B) | −0.2 | −1.0 | −31 | −0.11 | −0.1 | +1.9 | −0.43 |

When analyzing experimental results by referring to the foregoing Table 1, numerical differences between before experiment and after experiment in experimental items of acidity, organic matter, available phosphate, potassium, calcium, magnesium and electric conductivity are shown as −0.2, −8, −208, −0.27, −1.6, +0.7 and −0.55 in case of the experimental group, −0.1, −1, −135, −0.17, −0.7, +0.6 and −0.24 in case of the preparation of A company, 0, −6, −389, −0.25, −0.9, +0.7 and −0.45 in case of the preparation of Company G, 0, −2, −64, −0.18, −1.0, +1.8 and −0.33 in case of the preparation of Company B, and −0.2, −1.0, −31, −0.11, −0.1, +1.9 and −0.43 in case of the control group that had not been treated with the organic mixed solution. It can be confirmed from such results that the wood chips according to Example of the present invention have excellent efficacy as a fertilizer by showing superior numerical values in the measurement items of acidity, organic matter, available phosphate, potassium, calcium, magnesium, and electric conductivity compared to other company products.

As described above, a method of preparing a wood chip-type organic composite fertilizer according to the present invention is a very useful invention in which the wood chip-type organic composite fertilizer not only performs a function of helping in the growth of the crops for a long period of time, but also can properly adjust temperature and moisture required for the growth of the crops by gradually decomposing the wood chips to obtain a biological slow-release fertilizer effect, thereby sufficiently supplying nutrients to soil and crops, can perform a heat insulating material function of reducing width of a temperature change in the soil by reducing transfer of solar heat to the inside of the soil, and can increase landscape properties of planted trees by adding various colors to the wood chips.

The invention claimed is:

1. A method of preparing a wood chip-type organic composite fertilizer, the method comprising the steps of:
   (a) preparing wood chips by chipping at least one region of an outer bark-stripped unsawn timber, a bough, and a root into chips having a diameter of 1 to 4 cm;
   (b) preparing a liquid organic fertilizer by blending 73.0 to 80.0 wt % of an organic by-product, 6.1 to 9.0 wt % of a nutrient in which nitrogen (N), phosphorous (P) and potassium (K) are mixed at a weight ratio of (1):(0.1 to 0.4):(1.0 to 5.0), and 13.9 to 18.0 wt % of water ($H_2O$);
   (c) forming an organic mixed solution by mixing 75.0 to 85.6 wt % of the liquid organic fertilizer of the step (b) with 0.10 to 5.0 wt % of a water-dispersible binder and 14.3 to 20.0 wt % of a colorant;
   (d) obtaining colored wood chips by simultaneously immersing the colored wood chips of the step (a) in the organic mixed solution of the step (c) and applying hot air to the organic mixed solution at a temperature of 120 to 200° C. for 30 to 40 seconds to coat the woods chips with colors;
   (e) drying the wood chips to a high temperature between 120 to 200° C. to remove moisture formed on an outer surface of the wood chips of the step (d) and to make the organic mixed solution penetrate evenly into the wood chips at the same time; and
   (f) packing the dried wood chips of the step (e) by a predetermined weight unit, wherein drying of the wood chips in the step (e) comprises the steps of:
   transferring the wood chips through a conveyor, and drying the wood chips by applying hot air toward a conveyor belt from an air blower or a heater at the same time;
   secondly drying the wood chips by transferring the dried wood chips to a rotary dryer through the conveyor, and applying hot air to the wood chips within the rotary dryer; and
   transferring the secondly dried wood chips to a discharger through the conveyor to discharge the wood chips from the discharger, and applying hot air to the wood chips from the air blower or the heater to thirdly dry the wood chips at the same time.

2. The method of claim 1, wherein the organic by-product of the step (b) is one or a mixture selected from the group consisting of soybean meal, castor meal, rapeseed meal, Neem meal, rice bran oil cake, saccharide, peat, *Calamagrostis stricta*, sawdust, molasses, rice hulls, and animal organic matters selected from bone dust, guano, pressed fish cake, fish meal, chitosan, amino acid and steamed leather meal.

3. The method of claim 1, wherein the water-dispersible binder of the step (c) is one or a mixture selected from the group consisting of polyurethane, alkyd resin, polyacryl, polyurea, polyamide, polyolefin, polyvinyl acetate, polyether, a urethane based-acrylate based copolymer, a vinyl based-urethane based copolymer, an ethylene-vinyl alcohol based copolymer, a polyester copolymer, a silicone-acryl-urethane copolymer, and an ethylene/vinyl acetate copolymer.

4. The method of claim 1, wherein the colorant of the step (c) is one selected from an inorganic pigment and an organic dye.

* * * * *